United States Patent Office 3,123,016
Patented Mar. 3, 1964

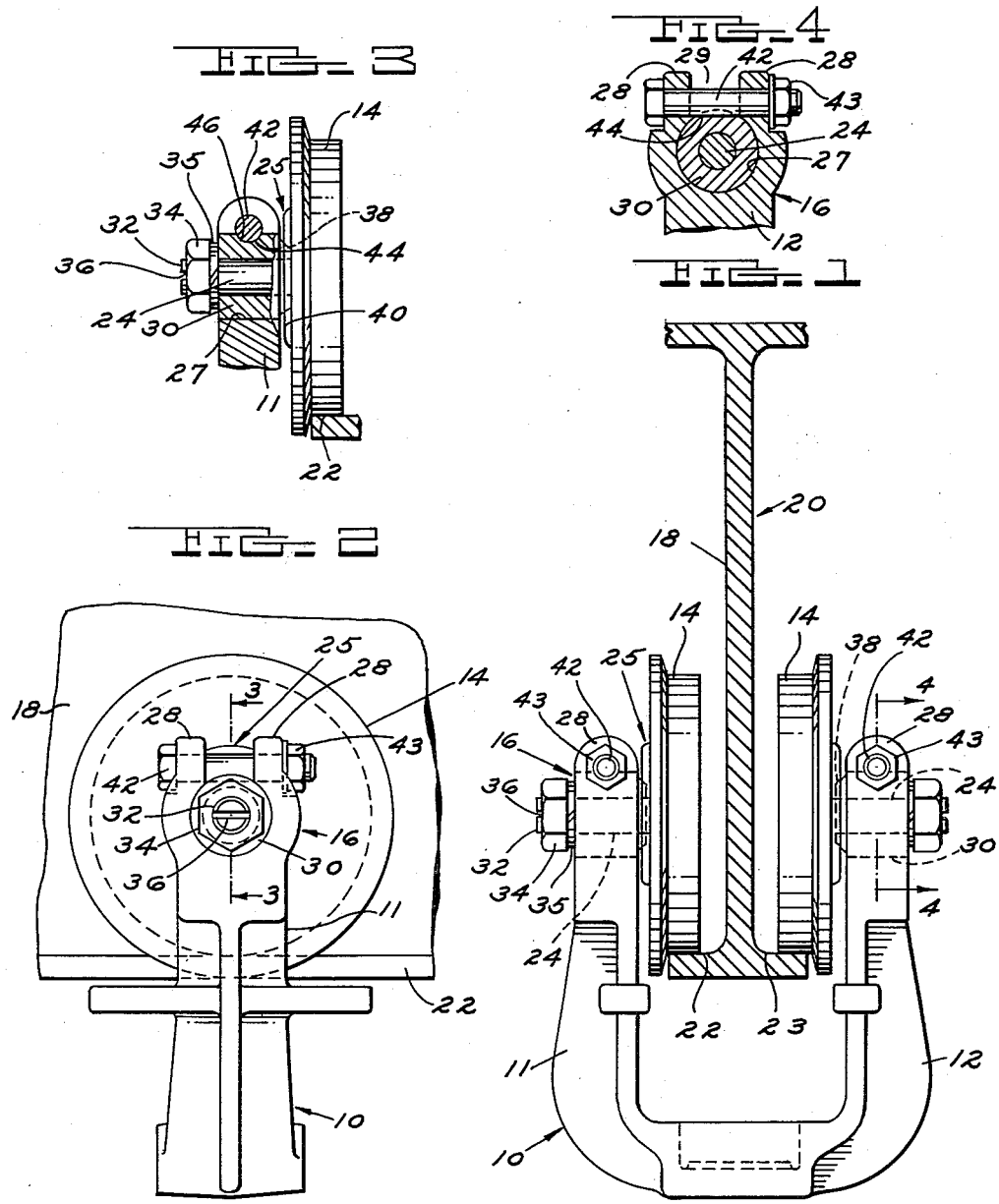

3,123,016
TROLLEY CONSTRUCTION
Franklin L. Bateman, West Olmstead, Ohio, assignor to Jervis B. Webb Company, Detroit, Mich., a corporation of Michigan
Filed Oct. 10, 1961, Ser. No. 144,129
6 Claims. (Cl. 105—154)

This invention relates to an improved construction for trolleys such as those employed in conveyor, monorail and underrunning crane systems, and is particularly directed to improved means for detachably connecting a trolley wheel to the trolley body or yoke so that a wheel may be removed without taking the trolley off its track.

In the usual trolley construction, a wheel is assembled to the trolley body by relative movement between the wheel and body in a direction parallel to the axis of wheel rotation and once the trolley has been placed on a track which includes a vertical web adjacent to the trolley wheels, it is not possible to remove a wheel for replacement or repair because of insufficient clearance between the wheel and the vertical track web. As a result, in many cases where a wheel becomes defective, it can only be removed and replaced by cutting away a portion of the track which must then be repaired after a new wheel has been installed.

The present invention provides a construction by which a wheel may be securely and rigidly affixed to a trolley body but yet can be removed therefrom by movement in a direction transverse to the axis of wheel rotation and is characterized by the provision of a bore in the wheel carrying portion of the trolley body for slidably receiving a bushing which in turn receives the wheel axle. The wheel mounting portion of the trolley body is of split construction, having a slot cut therethrough from the outer edge thereof to the aforementioned bore and extending along the length of the bore, this slot having a width which is in excess of the diameter of the wheel axle. Means are provided for removably securing the wheel axle to the bushing and for removably locking the bushing in the bore of the trolley body, permitting the wheel to be removed simply by disconnecting the wheel axle from the bushing, unlocking and sliding the bushing out of the bore and off the wheel axle, and then moving the axle transversely of the bore through the slot.

In the preferred construction to be described, the split wheel carrying portion of the trolley body is provided with a locking bolt extending transversely of the slot so that when this bolt is tightened the wheel carrying bushing mounted within the bore is securely clamped to the trolley body. Preferably a portion of the locking bolt projects within the diameter of the bore and engages a notch formed in the outer surface of the bushing so as to position and lock the bushing axially in the bore. This combination of clamping and locking action securely and rigidly connects the wheel to the trolley body.

Other features and advantages of the invention will be brought out in connection with the following description of the representative construction illustrated in the accompanying drawing consisting of:

FIGURE 1, an end elevation showing a two-wheel trolley constructed in accordance with the invention mounted on a conventional I-beam type of track;

FIGURE 2, a side elevation of the construction shown in FIG. 1;

FIGURE 3, a sectional elevation taken as indicated by the line 3—3 of FIG. 2; and FIGURE 4, a sectional detail taken as indicated by the line 4—4 of FIG. 1.

The trolley shown is of generally conventional configuration having a body or yoke 10 which includes a pair of upwardly extending brackets or arms 11 and 12 with a wheel 14 mounted on the upper wheel carrying portion 16 of each arm in facing relation to the vertical web 18 of a conventional I-beam track 20, each wheel riding on one of the lower track flanges 22 and 23. Each wheel includes an axle and usual anti-friction wheel bearing, not shown except for the inner race thereof which is indicated at 25.

As best shown in FIGS. 2 and 4, each wheel carrying portion 16 of the trolley body is bifurcated, being provided with a bore 27 and a pair of end tabs 28 which are separated by a slot 29 extending throughout the length of the bore and having a width which is in excess of the diameter of the axle 24. A bushing 30 fits slidably within the bore 27, and the wheel axle 24 is in turn slidably received within the bushing. The outer end 32 of the axle 24 is threaded to receive an axle nut 34 and lock washer 35 and is provided with a screwdriver slot 36 so that the axle can be held against rotation while turning the nut. When the axle nut 34 is tightened, the tapered inner end 38 of the bushing 30 is drawn into firm abutment against the inner race 25 of the wheel bearing, thus securely connecting the wheel and axle to the bushing 30.

Means are provided for retaining the bushing 30 in the wheel carrying portion 16 of the trolley body including a locking bolt 42 and nut 43, the bolt 42 extending through the tabs 28 of the trolley body transversely to the bore 27, with at least a portion of the bolt engaging a portion of the bushing so as to retain it against axial movement in the bore, this being accomplished in the construction shown by placing the bolt 42 so that the portion 44 thereof extends within the diameter of the bore 27 and engages a notch 46 (FIG. 3) formed in the outer surface bushing 30.

It is thus evident that should it become necessary to replace one of the wheels of a trolley while it is supported on the track 20, removal of the wheel nut 34 and locking bolt 42 will permit the bushing 30 to be withdrawn from the bore and slipped off the wheel axle 24. The wheel axle 24 can then be moved upwardly through the slot 29, or radially of the axis of wheel rotation, to separate the wheel from the bracket. A replacement wheel is assembled onto the bracket by the reverse procedure and when the locking bolt 42 is placed in engagement with the notch 46 in the wheel bushing 30 and securely tightened, the wheel mounting portion 16 of the bracket is firmly clamped about the bushing to positively prevent any relative movement between wheel and bracket in a direction radial of the axis of rotation, and the bushing 30 is interlocked with the trolley body to prevent any relative movement between wheel and trolley in a direction longitudinal of the axis of rotation.

Since the wheel may be assembled to the bracket by relative movement in a direction transverse to the axis of wheel rotation rather than parallel thereto as has heretofore been customary, a pair of facing wheels 14 may be spaced closer to each other because no end-wise clearance need be provided for ordinary assembly. In consequence, the track flanges 22 and 23 may be made narrower with an overall saving of both space and material.

While preferred embodiments have been described above in detail, it will be understood that numerous modifications might be resorted to without departing from the scope of the invention as defined in the following claims.

I claim:

1. A trolley having a trolley wheel mounting portion, a bore formed in said portion, a bushing removably mounted in said bore, a wheel axle extending through said bushing, said wheel mounting portion having a slot cut therethrough from the outer edge thereof to said bore along the length of said bore, said slot having a width less than the width of said bushing but in excess of the width of said axle, means for removably securing said wheel axle to said bushing, and means for retaining said bushing in said bore.

2. A trolley according to claim 1 wherein said means for retaining said bushing comprises a bolt carried by the said wheel mounting portion of said trolley and extending transversely across the said slot formed therein, at least a portion of said bolt projecting within said bore for engagement with a notch formed in said bushing.

3. A trolley according to claim 1 wherein said means for retaining said bushing includes means for decreasing the width of said slot to clamp said bushing in the wheel mounting portion of said trolley.

4. A trolley according to claim 1 wherein said means for retaining said bushing includes means carried by said trolley for engagement with said bushing to lock said bushing against axial movement in said bore.

5. In a trolley having a body and wheels, each wheel being rotatably mounted on an axle, means for removably connecting said axle and wheel to said trolley body comprising a wheel mounting portion formed on said trolley body and including a bore and a slot extending through the wheel mounting portion along the length of said bore, said slot having a transverse dimension less than that of said bore but in excess of the transverse dimension of said axle whereby said axle can be moved into and out of said bore through said slot in a direction of movement radial of the wheel axis defined by said axle, a bushing mounted in said bore, interengaging means between said bushing and wheel to limit relative axial movement therebetween, means for removably connecting said wheel axle to said bushing, and means for detachably securing said bushing to said trolley body.

6. In a trolley having a body and wheels, each wheel being rotatably mounted on an axle and bearing, means for removably connecting said wheel to said trolley body comprising a bifurcated wheel mounting portion formed on said trolley body including a bore and a slot extending through the wheel mounting portion along the length of said bore, said slot having a transverse dimension less than that of said bore but in excess of the transverse dimension of said axle whereby said axle can be moved into and out of said bore through said slot in a direction of movement radial of the wheel axis defined by said axle, a bushing mounted in said bore, said wheel axle extending slidably through said bushing, a nut mounted on said axle and engaging one end of said bushing, the other end of said bushing engaging said wheel bearing on tightening of said axle nut, and a locking bolt carried by said bifurcated wheel mounting portion of the trolley body, said locking bolt extending across said slot with a portion of said bolt projecting within said bore for engagement with a notch formed in said bushing to position said bushing axially in said bore.

References Cited in the file of this patent

UNITED STATES PATENTS

| | | |
|---|---|---|
| 1,188,949 | Koehler | June 27, 1916 |
| 1,489,104 | Armington | Apr. 1, 1924 |
| 2,281,794 | Peebles | May 5, 1942 |
| 2,758,551 | Kreiner | Aug. 14, 1956 |